United States Patent [19]

Zemelman et al.

[11] 4,333,315

[45] Jun. 8, 1982

[54] PROCESS FOR PREPARING A GASIFIED ICE PRODUCT

[75] Inventors: Valery B. Zemelman, Wilton, Conn.; Fredric Kleiner, New City; Michael J. Kuchman, Hopewell Junction, both of N.Y.

[73] Assignee: General Foods Corporation, White Plains, N.Y.

[21] Appl. No.: 260,147

[22] Filed: May 4, 1981

[51] Int. Cl.³ .............................................. F25C 1/00
[52] U.S. Cl. ............................................ 62/1; 62/48; 62/69; 55/52
[58] Field of Search ............... 62/1, 69, 70, 306, 48; 426/565; 55/52, 247; 261/87, 93

[56] References Cited

U.S. PATENT DOCUMENTS

| | | | |
|---|---|---|---|
| 2,575,509 | 11/1951 | Bayston | 62/1 X |
| 2,590,542 | 3/1952 | Jones | 62/1 X |
| 2,975,603 | 3/1961 | Barnes et al. | 62/1 |
| 3,007,919 | 11/1961 | Hoskins | 55/52 X |
| 3,086,370 | 4/1963 | Barnes et al. | 62/1 |
| 3,217,503 | 11/1965 | Mitchell et al. | 62/48 |
| 3,220,204 | 11/1965 | Adler et al. | 62/70 |
| 3,255,600 | 6/1966 | Mitchell et al. | 62/69 |
| 3,333,969 | 8/1967 | Mitchell et al. | 99/192 |
| 4,285,977 | 8/1981 | Yczek et al. | 62/48 X |

OTHER PUBLICATIONS

H. W. Herreilers, Ph.D. Thesis, University of Amsterdam (1937).

*Primary Examiner*—William E. Tapolcai, Jr.
*Attorney, Agent, or Firm*—Joyce P. Hill; Thomas R. Savoie; Daniel J. Donovan

[57] ABSTRACT

The invention provides an improved process for preparing gasified ice products; particularly, a process is provided which more efficiently produces gasified ice products having improved mechanical strength and high gas contents without spontaneous popping.

According to the present invention, transfer of a suspension of gas hydrate from a batch reactor is improved while at the same time the final product quality and the rate of freezing the suspension are improved. It has been found that gently agitating the suspension, while still under contact pressure, enables complete transfer of an essentially gas bubble free suspension to the freezing vessel.

17 Claims, No Drawings

PROCESS FOR PREPARING A GASIFIED ICE PRODUCT

DESCRIPTION

1. Technical Field

The present invention relates to gasified ice products; and more particularly to an improved process which enables the production of gasified products more efficiently and of better quality.

Gasified ice products are known which, due to the binding of the gas within a stabilized gas hydrate, have enabled delivery of high volumes of gas from relatively small volumes of ice. These products have shown potential for storage and transport of gases of many types. Typically, the gas will be carbon dioxide and the product will be employed to carbonate an aqueous liquid in the simplified home preparation of carbonated beverages. For the greatest economy and convenience, it is desirable to incorporate high levels of gas. Unfortunately, products having desirably high gas contents have heretofore been difficult to produce efficiently, have released gas unevenly and have been subjected to additional processing to attain the desired mechanical strength.

In its simplest form, the process for preparing gasified ice products has comprised contacting aqueous liquid with gas under high pressure for a sufficient period of time to form a desired level of gas hydrate, and then cooling to freeze the remaining unreacted liquid and entrap gas hydrate. Preferably, the freezing is done in a separate freezing chamber to control the product shape and appearance for packaging.

The production of gasified ice products having high gas contents typically requires high contact pressures, intensive mixing and extended processing times. The apparent simplicity of batch processing at first seems well adapted to meet this processing requirement. Unfortunately, until the present time, it has not been possible to transfer high solids content slurries of gas hydrate in aqueous liquid from the reacting vessel to the freezing vessel without leaving behind large quantities of the hydrate in a discontinuous phase analagous to a logjam.

Experience showed that products prepared by batch reaction and transfer to separate freezing chambers contained less gas than was originally incorporated. Moreover, it was the experience that whenever products were achieved with relatively high gas contents, they were nonuniform, exhibited poor mechanical strength in the frozen state, and liberated gas very unevenly, often with popping and splashing, when immersed in an aqueous liquid. The explosive popping and cracking of the ice can be hazardous where the gasified ice product is placed in water to release chlorine for a bleach solution.

2. Background Art

Barnes et al. in U.S. Pat. No. 2,975,603 disclosed a process for producing carbonated ice characterized by an extended storage life and its ability to form a superior effervescent beverage upon mixture with aqueous liquid. According to one aspect of the disclosure, the carbonated ice was prepared by subjecting aqueous liquid to a carbon dioxide pressure of at least about 200 psig and preferably less than 600 psig; maintaining the aqueous liquid and the carbon dioxide in contact for a time sufficient to permit absorption in the liquid of carbon dioxide in bound form and formation of carbonated ice containing at least about 25–27.5 milliliters of carbon dioxide per gram of ice; and withdrawing the carbonated ice.

Barnes et al. disclosed that the upper limit of the range of pressure which could be employed for all practical purposes was 600 psig. It was disclosed further that where pressures above 400 psig are employed during contact, it is preferred that the resulting product be degassed or stabilized for about 24 hours at $-10°$ C. The patentees indicated that during this period, any carbon dioxide which may loosely be held within the solid product is volatilized.

According to the specific example disclosed, water was contacted with carbon dioxide at a pressure of 400 psig. The pressurized reaction vessel was placed within a constant temperature bath maintained at $0°$ C. during the period of contact. After 75 minutes, the vessel was removed from the bath, cooled, depressurized and opened. The contents were removed and the solid ice was stored for 24 hours at $-10°$ C. to effect degasification. Testing of the degasified product revealed that it had a carbon dioxide content of 75 volumes carbon dioxide per gram of ice. While Barnes et al. indicate only that a vigorous evolution of gas was observed, it has been our experience with products prepared in accordance with this general procedure at high gas contents, that the product pops and cracks when placed in water and often splashes water from the container. Moreover, in order to remove the product from the pressure reactor, it is necessary to chip or chisel the ice out of the reactor vessel; the resulting product has very uneven dimensions.

U.S. Pat. No. 3,086,370, also to Barnes et al., discloses that in addition to carbon dioxide, gasified ice products containing other gases such as nitrous oxide, certain sulfur-containing gases, certain chlorine-containing gases, various inert gases and carbon monoxide could be formed. Because this patent was based upon a continuation-in-part application of the previously mentioned Barnes et al. patent, much of the same disclosure regarding pressures and degassing of the solid ice product is carried forward. No specific example within any of the gases employs a pressure of greater than 400 psig, and no disclosure of transferring the product prior to complete freezing is mentioned.

A similar disclosure is found in U.S. Pat. No. 3,217,503 which again was a continuation-in-part of the application which resulted in the first-mentioned Barnes et al. patent. This patent, however, describes in more detail the method for handling and transporting gasified ice to a desired point of liberation under atmospheric pressure while maintaining it at a temperature below its melting point.

Adler et al. in U.S. Pat. No. 3,220,204, stated that while the prior art procedures of Barnes et al. produce products which retain significantly high levels of carbonation during refrigerated storage, they noted that the products had a tendency to explode or pop (i.e., break apart and disintegrate with a loud noise) at an unpredictable point of time during dissolution. They indicated that when the Barnes et al. carbonated ice products were added to water or milk, they frequently exploded in the glass. A less spectacular product was required for commercial success.

Their solution to the problem entailed providing a high liquid surface to gas contact during the preparation of the hydrate. To achieve this, they employed a thin film of water which was subjected to carbon dioxide gas at a pressure and temperature above the eutectic point of the water and at a temperature low enough to form a hydrate. A suspension of hydrate in aqueous liquid was then transferred to a freezing zone and was converted to a stable form by freezing at a temperature below −3° C. While they retain the disclosure of high pressure levels for contact, the specific examples do not exceed 250 psig and the final carbon dioxide contents do not exceed 50 milliliters per gram (ml/g) of product. It has been our experience that a suspension of hydrate containing more than 50 ml/g of carbon dioxide could not be transferred because the reaction mixture becomes too viscous, i.e., contains greater than 30% solids total weight basis.

In U.S. Pat. No. 3,255,600 to Mitchell et al. there is disclosed a process for forming carbonated ice wherein liquid carbon dioxide and liquid water are mixed under controlled conditions to form the carbonated ice product. The inventors indicate that they discovered that liquid carbon dioxide results in a more rapid formation of the product while permitting more accurate control of the operating conditions. It has been our experience, however, that the use of liquid carbon dioxide requires the use of great quantities of energy and produces a product which has the popping and cracking problems associated with the earlier prior art.

Throughout this evolution of gasified ice products, Mitchell et al. disclose in U.S. Pat. No. 3,333,969, that the problem of uneven release of carbon dioxide had persisted. They indicated that an important problem present in the handling and use of carbonated ice, particularly in the lower portion of the 10 to 118 volume range, was the uneven release of carbon dioxide from the carbonated ice. They stated that this problem manifested itself in minor explosions or popping which, while not of dangerous nature where the gas was carbon dioxide, may disturb the user and splatter the liquid in which it was placed. Mitchell et al. proposed subdividing carbonated ice into discrete particles while maintaining the temperature of the ice below 0° C., and then compacting the discrete particles to form them into an adhered mass or briquette. Briquetting produced a gasified ice product having a commercially-satisfactory mechanical strength in the frozen state and also liberated entrained gas bubbles which are believed to cause the undesirable, spontaneous popping and exploding phenomena.

It is apparent from the foregoing discussion of the prior art that the problem of uneven and sometimes explosive release of gas from gasified ice products has long troubled those skilled in the art. While the earlier patents indicated that the problem was particularly acute with regard to products containing high volumes of carbon dioxide or other gases, the later prior art indicated that the problem also existed with regard to lower, more moderate gas containing products.

Moreover, it has been our experience that when aqueous suspensions, having the high contents of hydrate necessary to produce high gas content ice products, were transferred from a batch reactor to a freezing chamber, large quantities of hydrate remained in the reactor vessel and much lower than expected gas contents in the product resulted. It appeared as if there were some practical upper limit on attainable gas content. In addition, the prior art gasified ice products exhibited poor mechanical strength which is attributed to the presence of entrained free-gas cavities. The free-gas cavities cause the formed ice to break apart unpredictably as it is moved from the freezing vessel. Additional processing, such as grinding, blending and compacting the product particles was used to obtain uniformity of gas content and structural integrity. And, this resulted in yet further losses and made more difficult the attainment of structurally strong, high gas content products. Thus, there is still a definite need for an efficient, economical process that produces a gasified ice having satisfactory mechanical strength and high gas content without spontaneous popping.

DISCLOSURE OF INVENTION

In accordance with the present invention, we provide an improved process for preparing gasified ice products characterized by high gas contents, a high degree of mechanical strength in their frozen state, vigorous, uniform effervescence when placed in water and quiet, nonpopping, nonexplosive melting in air. Also provided is the product of this process. In its broad aspects, the process comprises: contacting aqueous liquid in a closed pressure vessel with a conditionally-stable, hydrate-forming gas under conditions of pressure and temperature effective to form a stable gas hydrate; vigorously agitating the aqueous liquid during the period of contact to disperse bubbles of the gas therein in continuous, efficient mass transfer contact; maintaining contact for a period of time effective to form a suspension comprising gas hydrate dispersed within said aqueous liquid; degasifying the suspension by gentle agitation to dislodge unreacted and undissolved gas bubbles from the suspension and permit them to rise to the upper surface thereof; transporting the suspension through a port in the vessel while under pressure to a pressurized freezing chamber; and freezing the essentially gas bubble-free suspension under pressure.

In carrying out the process of this invention, the gasified ice products will preferably be prepared from water. Although some advantages in terms of reproducibility of precise conditions and stability of the final product may be obtained by using distilled or deionized water, the process of the present invention is not limited to these. The person of ordinary skill in the art may employ various types of solutions, and in the case of food products such as beverages, various materials including sugar, color, flavor, acidulents, and the like, knowing that the ease of process control or the stability of the final product may be decreased. Thus, the term water or aqueous liquid will be hereinafter employed to include water containing added materials such as these mentioned as well as water per se.

As employed herein, the degassing step of this invention is meant to include the agitation of the hydrate suspension to dislodge unreacted and undissolved gas bubbles entrained in the suspension in a manner that permits the gas bubbles to rise to the upper surface of the suspension. "Degas" and "degasify" are used interchangeably in the above context.

Among the gases which are capable of forming conditionally-stable hydrates are those which form hydrates which appear to be characterized by a molecular complex between the gas and water under the controlled conditions of temperature and high pressure. All of the suitable gases exist in the gaseous state at atmospheric pressure at temperatures above 0° C. Additionally, these gases combine with water to form gas hydrates containing six or more moles of water per mole of gas. The hydrates are further characterized by their ability to be stored in essentially stable condition at temperatures below about 0° C. and then be decomposed by melting in an aqueous liquid.

Specifically identified as gases capable of forming conditionally-stable hydrates are various oxides of non metals, typically nitrous oxide; sulfur-containing gases including hydrogen sulfide; chlorine-containing gases, including chlorine and methylene chloride; various inert gases such as helium, argon, krypton, and neon; carbon monoxide, and carbon dioxide. Preferably, the gas will be selected from the group consisting of these, and most preferably will comprise carbon dioxide, nitrous oxide, or chlorine, due to their adaptability to the process and their wide-spread utilities. While not intending to be bound to the specific example of carbon dioxide, the present detailed description will focus on this as exemplary, due to its ready adaptability to use in preparing carbonated beverages for which there appears to be an immediate commercial opportunity.

Best Mode for Carrying Out the Invention

The present invention provides a gasified ice product characterized by a uniform high gas content, a high degree of mechanical strength in its frozen state, a vigorous, uniform evolution of gas when placed in an aqueous liquid and a quiet, nonpopping, nonexplosive character when placed in air. The following description will discuss a preferred process where, in the preparation of carbonated ice, a suspension of carbon dioxide hydrate in aqueous liquid is prepared in a pressurized reactor, the suspension is then degassed while still under the same pressure, and the degassed suspension is transferred to a freezing chamber wherein it is frozen under pressure.

In the initial stage in processing, carbon dioxide, the preferred conditionally-stable, hydrate-forming gas, is contacted with an aqueous liquid under conditions of temperature and pressure capable of forming a stable gas hydrate. To achieve the stable hydrate, the temperature must be below that at which the gas hydrate decomposes at the existing pressure in the system.

The pressure during the period of contact for hydrate formation according to the present invention is preferably high to obtain the desired high gas content within a commercially practical period of time.

While pressures of 350 psig and lower can be employed with satisfactory results, it is preferred to employ greater pressures during the contact; preferably, at a level of from about 400 to about 650 psig. The reason for this is that the higher the pressure during contact, the less contact period is required. A particularly preferred pressure range will be from about 450 to 600 psig.

To achieve practically high reaction rates, it is essential to maintain good gas-liquid contact during the period of reaction. This can be achieved in a pressurized reaction vessel by vigorously agitating the aqueous liquid during the period of contact to disperse the bubbles of gas therein, thereby effecting continuous, efficient mass transfer between the gas and liquid phases. To achieve a high degree of gas-liquid contact, with bubbles of gas continuously maintained at a suitably small size and dispersed throughout the liquid, a high degree of mixing shear is usually necessary. At the start of the reaction, the aqueous $CO_2$ solution is very fluid and relatively nonviscous. During later stages of the reaction, the suspension of hydrate complex within the aqueous liquid becomes relatively viscous due to its slush-like character. The reaction temperature remains constant during the hydrate formation step.

Various means can be employed according to the present invention to achieve the desired high degree of agitation and liquid-gas contact. Among these are mechanical stirrers, mechanical vibrators, gas sparging, liquid spraying and the like. The exact design of the reactor and the mixing device, will of course depend upon a number of factors including the scale of the processing equipment.

The contact between the gas and the aqueous liquid are maintained for a period of time effective to form a gas hydrate suspended in the aqueous liquid. The exact time required for hydrate formation at a sufficiently practical level for suitable gasified ice products, depends upon a number of factors including the pressure as described above, the concentration of solids within the aqueous liquid, the efficiency of heat withdrawal from the aqueous liquid, and the efficiency of contact between the gas and the aqueous liquid. Thus, there is no universal set of preferred contact times. Experience will show, however, that a particular reaction can be standardized to obtain a prediction of contact time for that specific reaction.

Because one of the objects of the invention is to prepare gasified ice products having high gas contents, the contact between the gas and the aqueous liquid is preferably maintained for a period of time effective to bring the hydrate-forming reaction to within at least 75% and preferably about 90% of completion. When the temperature of the aqueous liquid begins to fall after maintaining a steady value during reaction due to the evolution and removal of heat, the reaction is considered to be satisfactorily completed. At this point, the evolution of the latent heat of hydrate formation will cease, and the heat exchange contact with the aqueous liquid will cause the temperature of the liquid to drop.

In the preferred embodiment wherein carbon dioxide is contacted with an aqueous liquid to form carbonated ice, the contact will preferably be maintained for a period of time effective to form sufficient hydrate to produce a product containing greater than 50, preferably greater than 60, and most preferably being at least 85 milliliters of carbon dioxide per gram of product. While it is theoretically possible to achieve higher carbon dioxide contents, on the order of up to about 118 to 120 milliliters per gram of product, and these products are intended to be included within the scope of the invention, the most practical products will contain sufficient nonhydrated, $CO_2$-saturated water to form a continuous frozen coating around dispersed hydrate complexes and thereby protect these hydrate complexes from decomposition during storage.

After the desired degree of hydrate formation is achieved, the hydrate must be recovered as a dispersed phase within a continuous matrix of slightly carbonated water. It is a prime feature of the present invention that the invention makes it possible to efficiently transfer all the suspension while still flowable and under pressure from the reacting vessel to a separate freezing vessel. The successful transfer eliminates most or all of the hydrate loss normally experienced. Moreover, the suspension freezes faster and has less entrained, unreacted and undissolved gas. This is a significant achievement in that it also provides excellent mechanical strength and, consequently, higher production yields. The product is a relatively "quiet", hard, nonpopping ice which uniformly and evenly effervesces when immersed in an aqueous liquid.

According to the invention, the suspension within the reactor is maintained under pressure while being degassed by agitating it in a manner effective to dislodge gas bubbles from the suspension and permit them to rise to the upper surface thereof. This can be achieved by agitating with the same means employed for vigorously agitating during the period of contact, or can be done by different means. The important factor here is that the agitation for degassing be insufficient to create new bubbles in uniform dispersion within the suspension, but that it be sufficiently strong to dislodge them from contact with hydrate complex and keep them in a state mobile enough to work their way to the surface of the suspension.

Without agitation, the bubbles will adhere to the hydrate and bring the hydrate complex themselves to the liquid surface. This results in a frothy slush at the top of the reactor which is rich in hydrate, and a liquid at the bottom of the reactor which is hydrate poor. When transfer of such slurry is attempted, the liquid at the bottom is rapidly withdrawn from the chamber leaving behind the frothy slush which is too light, viscous and discontinuous to move. We note at this point, that none of this was directly observable carrying out the reaction in conventional equipment and making observations in conventional manner. While the reactor was closed, the contents of the reactor could simply not be observed. It was not until a transparent reactor was constructed and directly observed that we were able to note what was occurring and devise a means for solving the problem.

While not limited to any particular type of agitation means, we have found that mechanical stirrers of the type which are useful for maintaining agitation during contact are also suitable for the removal of entrained gas bubbles where they are run at lower speeds. In the preferred situation where a mechanical stirrer containing at least one impeller blade on a rotating shaft is employed for both the contact stages and the step of degasification, the speed of the mechanical stirrer during the step of degasifying the suspension can be from about 10 to 30% of the speed during the period of contact. This gentle agitation, sufficient to eliminate stagnant zones throughout the entire slurry, maintains the hydrate in suspension and fairly uniformly dispersed throughout the aqueous liquid, while the gas bubbles are permitted to rise. The resulting suspension has an overall higher density and is a more continuous phase enabling it to flow uniformly, rapidly, and completely from the reactor to the freezing chamber.

It is an advantage of the invention that the flow from the reactor to the freezing chamber can be accomplished by the combined effects of gravity and pressure differential alone. It is necessary to maintain the suspension under pressure during transporation and freezing so that the hydrate does not destabilize; however, the pressure within the freezing chamber should not be elevated to that extent as employed in the reactor. This permits a pressure differential to be established between the reactor and the freezing chamber to effect the transfer. If desired, however, additional means such as an Archimedean screw can be employed to provide positive displacement.

The specific configuration of the freezing chambers and the transfer lines does not form a part of the present invention, but can be of any suitable design. In this regard, the disclosure of Adler et al. in U.S. Pat. No. 3,220,204 is incorporated by a reference. That patent shows the transfer of a hydrate-containing slush from a reactor to pressurized freezing molds. This particular arrangement is suitable according to the present invention also.

The freezing chamber will be maintained at a pressure sufficient to prevent loss of hydrate and at a temperature sufficient to freeze the suspension completely. In order to prevent decomposition of hydrate or condensation of $CO_2$ gas during the freezing or reaction process, it is necessary to reduce temperature and pressure in the freezing chamber or in the reactor vessel in a coordinated manner to remain within the temperature and pressure regions of stable hydrate according to the $CO_2$-water-hydrate phase diagram described by H. W. Herreilers, Ph.D. Thesis, University of Amsterdam (1937). Thus, for example, for a reaction pressure of 500 psig, which corresponds to a reaction temperature of 8° C., the slurry is first cooled to 3° C. at constant pressure; decompressed to 320 psig at constant temperature of 3° C., cooled to 1° C. at constant pressure, decompressed to 250 psig at constant temperature and, finally, cooled to $-12°$ C. at constant pressure during which time the entire slurry freezes completely.

This stepwise procedure may be done in the reactor vessel, followed by degassing and transportation to the freezing vessel at the lower pressure (250 psig). Freezing temperatures usually are below about $-3°$ C., and preferably within the range of from about $-5°$ C. to $-12°$ C. It is an unexpected additional advantage of the present invention that when unreacted gas is removed, freezing times are significantly decreased, typically on the order of from about 5 to about 10% over conventional practice when unreacted gas is not removed before freezing. This is an addition to the other advantages of the present invention which for the first time permit the preparation of quiet, uniformly effervescent, high-gas-content, gasified ice products in an efficient manner.

The carbonated ice prepared in the above manner can be packaged in a suitable container such as a can or styrofoam cup. When packaged in containers of this type, the carbonated ice will provide a high degree of storage stability at ambient pressure and at temperatures within the range of from about $-5°$ to $-20°$ C. for time periods of in excess of 6, and preferably in excess of 8, months.

Along with the carbonated ice, in the same package or in a separate adjoining package, there may be provided a composition for preparing a soft drink such as the kind which comprise a color, flavor, and edible acidulent, and a sweetener, all of these ingredients being present in amounts effective to provide the desired taste and eye appeal.

The following example is presented for the purpose of further illustrating and explaining the present invention and is not to be taken as limiting in any regard. Unless otherwise indicated, all parts and percentages are by weight.

EXAMPLE 1—Degassing in the Reactor Vessel at 500 psig

This example illustrates the preparation of a carbonated ice product according to the invention.

To prepare a suspension of carbon dioxide hydrate in water, 1,000 milliliters of water are charged into a 2-liter reaction vessel which is then pressurized with carbon dioxide gas at a pressure of 500 psig. The temperature of the reactor is controlled by a constant temperature bath wherein the heat exchange medium has a temperature of 0° C. The equilibrium temperature within the reactor at 500 psig will be about 8° C. and reaction will continue at this temperature until completion. During the period of reaction, a mechanical stirrer is extended into the reactor and is rotated at a speed of 1,000 rpm. The contact between the carbon dioxide and the water is maintained for a period of one hour. After the period of reaction, the speed of the stirrer is reduced from 1,000 to 100 rpm. After gently stirring at 100 rpm for about 3 minutes to dislodge entrained gas bubbles from the hydrate crystals, the reaction mixture is transferred to a freezing vessel held at a slighly lower pressure, e.g., 490 psig, while controlling the reactor pressure at 500 psig with carbon dioxide (supplied at 6°–8° C. to prevent thermal decomposition of hydrate) to effect the transfer of degassed hydrate by pressure differential. In the freezing vessel, the degassed hydrate slurry is cooled and decompressed in a stepwise, coordinated manner to 250 psig and 1° C. to remain within the temperature and pressure regions of stable hydrate. Finally, the degassed hydrate slurry is cooled to −12° C. at 250 psig for about 3 hours to obtain a quiet, uniformly-effervescent, high-gas-content, carbonated ice product having commercially-satisfactory mechanical strength. By freezing the product in the stepwise, coordinated manner, condensation of $CO_2$ gas is avoided within the freezing vessel as well as decomposition of hydrate crystals. Upon analysis, the carbonated ice product shows a gas content of about 75 milliliters per gram of ice and provides a vigorous, uniform effervescence when dropped in a non-carbonated beverage prepared from a commercially-available dry beverage mix sold under the trademark Kool-Aid.

EXAMPLE 2—Degassing in the Reactor Vessel at 250 psig

In substantially the same manner as described in Example 1, a suspension of carbon dioxide hydrate in water is prepared. While maintaining stirring at 1,000 rpm, the hydrate slurry is cooled and decompressed in a stepwise, coordinated manner so that temperature and pressure conditions remain within the region of stable hydrate. The final conditions of pressure and temperature in the reactor vessel are 250 psig and 1° C., respectively. At these final conditions, gentle stirring at 100 rpm is used for about 3 minutes to dislodge entrained gas bubbles from the hydrate crystals. The gas-bubble-free reaction mixture is then transferred to a freezing vessel, maintained at 240 psig by controlling the pressure in the reaction vessel at 250 psig with carbon dioxide (supplied at 0°–1° C. to prevent thermal decomposition of hydrate) to effect the transfer by pressure differential. The degassed hydrate slurry is completely transferred in this manner whereupon it is cooled to a temperature of about −12° C. at 250 psig for about 3 hours to obtain a completely frozen, high gas content, mechanically-strong, carbonated ice product. Upon analysis, the carbonated ice product shows a gas content of about 75 milliliters per gram of ice and provides a vigorous, uniform effervescence when added to tap water.

As a comparison, the same procedures as above are carried out except that the gentle agitation for degassing purposes is omitted in each example. In the comparison examples, 80–90% of the hydrate in the suspension remains behind as a frothy slush in the reactor and the resulting product contains only 20–30 milliliters of carbon dioxide per gram of ice.

The above description is for the purpose of teaching the person skilled in the art how to practice the present invention. This description is not intended to detail all of the obvious modifications and variations of the invention which will become apparent to the skilled worker upon reading. However, applicants do intend to include all such obvious modifications and variations within the scope of their invention which is defined by the following claims.

What is claimed is:

1. A process for preparing gasified ice characterized by high degree of mechanical strength in its frozen state and a high gas content, which comprises: contacting aqueous liquid in a pressurized vessel with a conditionally-stable, hydrate-forming gas under conditions of pressure and temperature effective to form a stable gas hydrate; vigorously agitating the aqueous liquid during the period of contact to provide bubbles of the gas dispersed therein in continuous, efficient mass transfer contact; maintaining contact for a period of time effective to form a suspension comprising gas hydrate dispersed within said carbonated aqueous solution; degassing the suspension while maintaining said suspension under pressure by agitating to a degree effective to dislodge unreacted and undissolved gas bubbles from the suspension and permit them to rise to the upper surface thereof; transporting the essentially gas-bubble-free suspension through a port in the vessel while under pressure to a pressurized freezing vessel; and freezing the essentially gas-bubble-free suspension under pressure.

2. A process according to claim 1 wherein the gas comprises a member selected from the group consisting of carbon dioxide, carbon monoxide, nitrous oxide, hydrogen sulfide, chlorine, methylene chloride, helium, argon, krypton, and neon.

3. A process according to claim 2 wherein the gas is carbon dioxide and the pressure during contact is greater than 350 psig.

4. A process according to claim 3 wherein the pressure during contact is within the range of from 400 to 650 psig.

5. A process according to claim 4 wherein the pressure during contact is within the range of from 450 to 600 psig.

6. A process according to claim 3 wherein the pressure within the freezing vessel is within the range of from 200 to 350 psig.

7. A process according to claim 6 wherein the pressure within the freezing vessel is within the range of from 250 to 300 psig.

8. A process according to claim 1 wherein the suspension is transported from the pressure vessel by a pressure differential between the pressure vessel and the freezing vessel.

9. A process according to claim 1 wherein the agitation, during both the period of contact and the step of degassing the suspension is effected by a mechanical stirrer fitted with at least one impeller blade.

10. A process according to claim 9 wherein the speed of the mechanical stirrer during the step of degassing the suspension is from about 10 to about 30 percent of the speed during the period of contact.

11. A process according to claim 3 wherein the period of contact is effective to produce a sufficient amount of carbon dioxide hydrate to provide at least 50 milliliters of carbon dioxide per gram of product ice.

12. A process according to claim 11 wherein the period of contact is effective to produce a sufficient amount of carbon dioxide hydrate to provide at least 60 milliliters of carbon dioxide per gram of product ice.

13. A process according to claim 12 wherein the period of contact is effective to produce a sufficient amount of carbon dioxide hydrate to provide from 75 to 110 milliliters of carbon dioxide per gram of product ice.

14. A process according to claim 11 wherein the pressure during contact is within the range of from 400 to 650 psig.

15. A process according to claim 14 wherein the agitation, during both the period of contact and the step of degasifying the suspension, is effected by a mechanical stirrer the speed of which during the step of degasifying the suspension is from about 10 to about 30 percent of the speed during the period of contact.

16. A process according to claim 15 wherein the pressure within the freezing vessel is within the range of from 200 to 300 psig.

17. A product prepared according to the procedure of either of claims 1 or 16.

* * * * *